April 23, 1963  H. V. THADEN  3,086,576
APPARATUS FOR FORMING PRODUCTS FROM RESIN-IMPREGNATED
LONG FIBER FILAMENTS
Filed Dec. 14, 1959  2 Sheets-Sheet 1
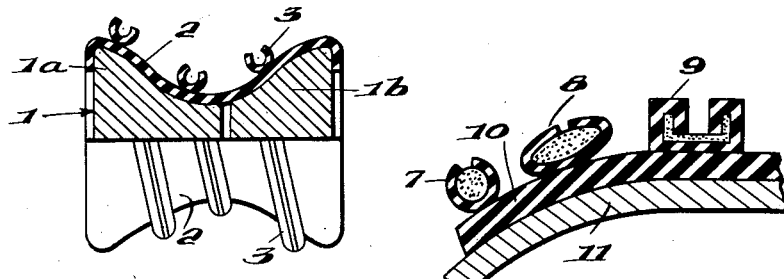
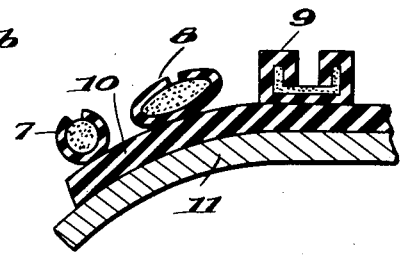
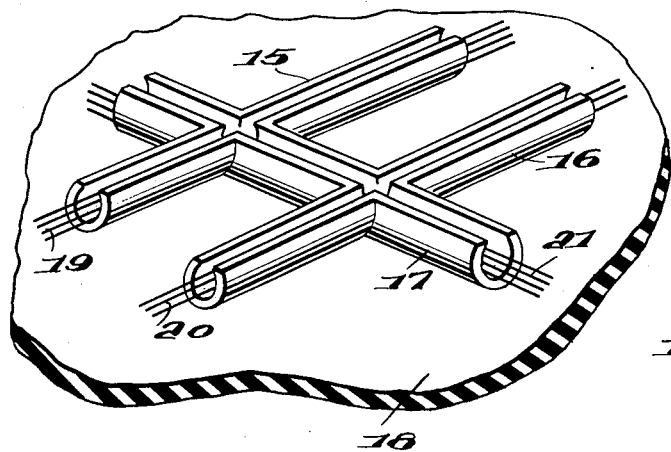
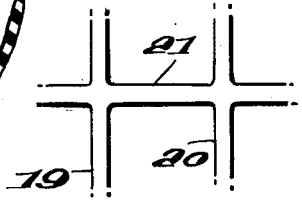
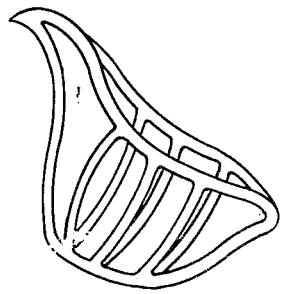
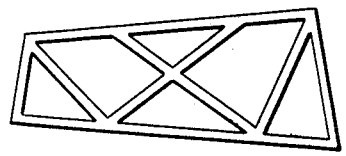
INVENTOR
Herbert V. Thaden
BY Peirce, Scheffler & Parker
ATTORNEYS

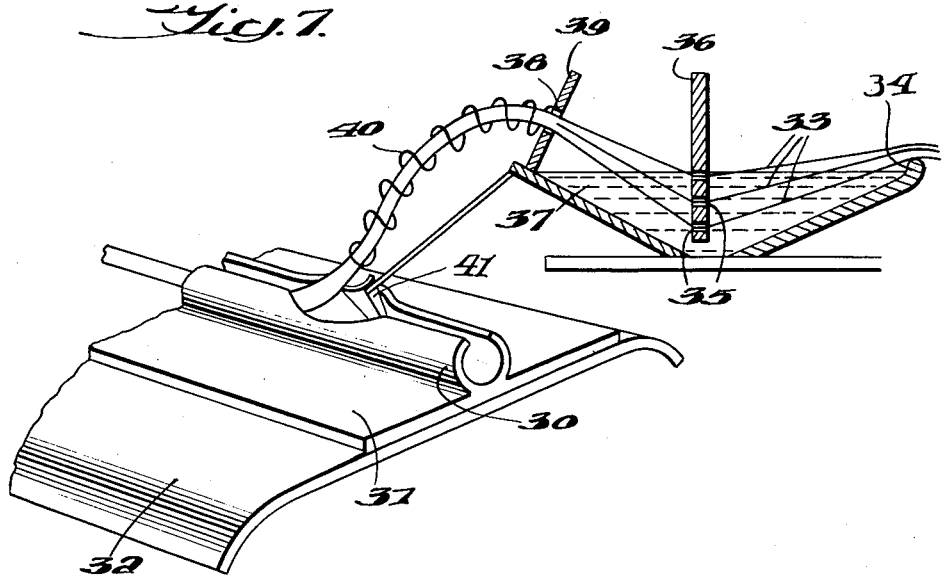
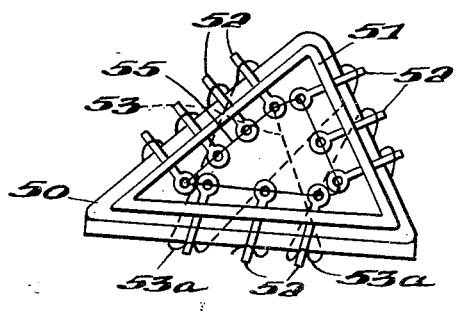
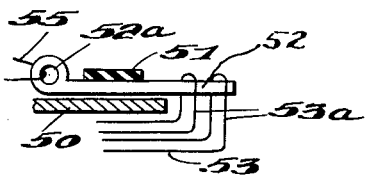

United States Patent Office 3,086,576
Patented Apr. 23, 1963

3,086,576
APPARATUS FOR FORMING PRODUCTS FROM RESIN-IMPREGNATED LONG FIBER FILAMENTS
Herbert V. Thaden, 1101 N. Main St., High Point, N.C.
Filed Dec. 14, 1959, Ser. No. 859,468
4 Claims. (Cl. 156—433)

This invention relates to the method and apparatus for forming rod-like and sheet-like articles of various configurations from skeins or bundles of parallel fibers of glass or the like impregnated with a thermosetting resin.

Long skeins of roving of parallel fibers formed from glass, sisal, synthetic materials or the like have a cost approximately half that of woven roving or woven cloth formed from the fibers, and, when impregnated with a thermosetting resin, a product formed from the longitudinal fibers has a relative strength almost two and one-half times as great as a similar product formed from impregnated chopped strand random roving or woven roving. In the past it has been extremely difficult to manufacture rod or sheet-like products from parallel-fiber roving impregnated with a thermosetting resin, mainly due to the difficulties involved in handling the roving and in arranging the same in a suitable mold.

The primary object of the present invention is to provide a method and apparatus for forming rod and sheet-like products from resin-impregnated roving of longitudinally-arranged parallel fibers.

A more specific object of my invention is to provide a method and apparatus for forming rod-shaped objects from roving of resin-impregnated parallel fibers by means of a flexible split sleeve secured to a flexible mounting sheet and adapted to be mounted on a supporting mandrel of desired configuration, said split sleeve being adapted to be stripped from the resulting rod-shaped product upon hardening of the thermosetting resin.

Another object of my invention is to provide a method for forming rod-shaped articles which comprises the steps of impregnating skeins of parallel fibers with a thermosetting resin, molding the skeins in a strippable split sleeve until the resin has set or become hardened, and stripping the sleeve from the hardened resulting product.

A further specific object of my invention is to provide an apparatus for forming sheet-like products from a skein of resin-impregnated longitudinal fibers, said apparatus including a base member having a plurality of pins removably extending outwardly from the periphery thereof, the skein of longitudinal fibers being woven on one side of the base member by means of said pins in any desired pattern to any desired thickness.

Another object of my invention relates to the forming of sheet-like products from a resin impregnated skein of parallel fibers wherein the skein is continuously woven upon one face of supporting member and is retained thereon until setting of the resin, whereupon the hardened sheet-like product is removed from the supporting member.

Other objects and advantages of my invention will become more apparent from a study of the following specification when considered in conjunction with the accompanying drawings, in which:

FIG. 1 is a partly-sectioned side elevational view of the molding apparatus designed for forming skeins of resin coated parallel fibers into a product having a helical configuration;

FIG. 2 illustrates three various configurations of split sleeves attached to a flexible supporting sheet mounted upon a fixed mandrel for forming rods of different cross-sectional configurations;

FIG. 3 is a perspective view of another embodiment of the invention wherein the split sleeves are arranged at angles to each other to integrally form joints in the resulting molded product;

FIGS. 4–6 illustrate various configurations of products which may be molded according to the invention;

FIG. 7 is a perspective diagrammatic view illustrating the method and apparatus by which the skeins of parallel fibers are impregnated with resin and introduced into the split sleeve mold;

FIG. 8 illustrates another apparatus and method by which sheet products may be formed from impregnated skeins of parallel fibers; and FIG. 9 is a detailed sectional view of the embodiment of FIG. 8.

Referring first more particularly to FIG. 1, a molding apparatus is illustrated by means of which a helical product may be formed from long skeins or bundles of parallel or random roving fibers (such as glass fibers, nylon filaments, filaments of other synthetic plastic materials, wire, cloth, sisal, etc. or various combinations thereof) impregnated with a suitable thermosetting resin (such as phenol-formaldehyde, urea-formaldehyde, and the like), or other types of bonding material, such as thermoplastic resin. Rigid, semi-rigid and possibly rubber-covered glass roving may be used. While the roving may be flexible laterally, it should be non-extensible in the longitudinal direction. The molding apparatus consists of a rigid supporting mandrel 1 upon which is mounted (by suitable mounting means, not shown) the flexible mounting sheet 2 to which is integrally secured the flexible split sleeve element 3. While the mounting sheet 2 and the split sleeve 3 are preferably formed from a deformable latex material, it will be apparent that other deformable materials may be used equally as well, such as various types of flexible synthetic plastic materials, for example.

According to the apparatus of FIG. 1, the pliable skeins of resin-impregnated parallel filaments are manually or mechanically inserted within the helically-arranged split sleeve 3 (which has been mounted upon the outer periphery of the mandrel 1 by means of the flexible mounting sheet 2). The filaments are retained in position in the split sleeve 3 until the resin sets and the resulting helical product becomes hardened, whereupon the flexible split sleeve 3 is removed by stripping or peeling. In order that the mandrel may be more readily separated from the resulting product, the mandrel may be transversely divided at its central portion into two sections 1a and 1b, which sections may be displaced axially apart for removal from the helical product. The flexible mounting member 2 and the split sleeve 3 secured thereto may then be radially compressed somewhat for axial removal from the helical product. If desired, prior to insertion of the impregnated skeins within the split sleeve, the inner periphery of the sleeve may be coated with a material (such as wax or the like) which will prevent adherence of the hardened rod-shaped product to the sleeve.

FIG. 2 illustrates three split sleeve configurations 7, 8, 9 integrally secured to the flexible mounting sheet 10 mounted upon the rigid mandrel 11. A rod of circular cross-section will be formed within split sleeve 7, and rods of oval and U-shaped cross-sectional configurations will be formed in split sleeves 8 and 9, respectively. It is obvious that rods of various other cross-sectional configurations may similarly be formed by other types of split sleeve elements mounted upon flexible mounting members.

Referring now to FIG. 3, a molding apparatus is illustrated wherein a plurality of split sleeves 15, 16 are arranged at right angles to another split sleeve 17, all of said sleeves being secured to the flexible mounting member 18. The resin impregnated fiber skein groups 19 and 20 are arranged at right angles to the fiber skein group 21 and upon setting of the resin binder, rigid joints will be obtained. It should be mentioned that at the junction points of the groups of fiber skeins, the skeins may be woven or tied together in any suitable manner, or the fibers of one group may be centrally split to receive the other fiber group to insure a structurally strong connection. Various other types of joint structures may, of course, be obtained. The mounting sheet 18 may be positioned on a mandrel of suitable shape (planar, concave, or convex) with the split sleeves being bent correspondingly to conform to the surface of the mandrel.

FIG. 4 illustrates the product which would be formed from the mold of FIG. 3, and FIG. 5 is an example of a complex chair seat frame which might be formed with the use of a convex mandrel. Many configurations of structural light-weight frame-type elements may be formed according to the invention, one example of which is illustrated in FIG. 6.

The method and apparatus for forming a rod-shaped product from skeins of parallel filaments and for inserting the skeins within the split sleeve is illustrated in FIG. 7. The split sleeve 30 is secured to the flexible mounting sheet 31 which is mounted upon the support or mandrel 32. The longitudinal skeins of roving 33 are fed over the stationary guide means 34 and through the apertures 35 in the skein separator plate 36 which is submerged within the liquid resin bath 37; each fiber skein is thus completely impregnated with resin on its entire outer periphery. The fiber skeins are then fed through a consolidating and metering aperture 38 in the stationary plate 39. Excess resin will be removed from the filament group and will be redeposited by gravity into the resin bath 37. The filament group is then fed axially through the light-wire coil 40 which is secured at its upper end to the plate 39. The coil 40 provides means for handling and guiding the wet filament group or roving which is manually or mechanically introduced within the split sleeve 30. When the split sleeve is filled along its length with the fiber filaments, the filament group is severed by suitable cutting means (not shown). If desired, tool means 41 may be provided for partially spreading apart the walls of the split sleeve intermediate its ends to facilitate the insertion of the skein group within the sleeve.

FIGS. 8 and 9 disclose an apparatus by means of which a sheet-like product may be formed from long-resin impregnated filament skeins. The apparatus consists of a base plate 50 to one surface of which is secured by staple means or the like a flexible strip 51 of rubber or other resilient material. The strip extends parallel to the edges of the base plate and is spaced slightly inwardly therefrom. Removably positioned intermediate the strip 51 and the base plate 50 are the pins 52 the free ends of which extend outwardly from the base plate substantially normal to the edges thereof. At their other ends the pins have eyelet portions 52a.

To form the sheet product on the apparatus, the continuous fiber filament skein 53 is woven back and forth across the under surface of the base plate 50 and is looped over the ends of the pins which extend outwardly from the upper surface of the base plate beyond the edges thereof. The filament skein may be wound or weaved in any desired manner or to any desired thickness on the underside of the base plate. While the continuous skein is preferably already treated with resin prior to weaving on the pins, it is of course possible that the fibers might be impregnated with resin (by painting, spraying, submersion or the like) after the skein has been mounted on the base plate 50 by the portions 53a looped over pins 52.

Once the resin has set and the resulting sheet-like product has hardened, the pins are displaced axially by the eyelet portions 52a in a direction away from the edges of the base plate with the result that the pin ends are withdrawn from the filament looped portions 53a. If desired, a draw string or wire 55 may be passed through the eyelet portions 52a of the pins to assist in the axial displacement of the pins. The resultant product may then be separated from the base plate 50 and the loop portions 53a may be severed from the product if desired. In order to prevent the sheet-like product from adhering to the under surface of the base plate 50, the surface of the plate may be specially treated with a coating (such as wax or the like) to which the resin will not adhere, or a suitable sheet or film could be placed on the surface of the base plate prior to the winding or weaving operation.

It will be obvious that the base plate 50 may have a convex configuration if desired so that the resulting sheet product will have a corresponding configuration. The peripheral outline of the base may be polygonal, oval, circular or other configuration as desired. Thus it is apparent that many sheet-like products of extremely complex contours and configurations might be readily formed in accordance with the present invention.

While in accordance with the patent statutes, I have illustrated and described the best forms and embodiments of the apparatus and methods of the invention now known to me, it will be apparent to those skilled in the art that other changes and slight deviations may be made in the apparatus and method described without deviating from my invention as set forth in the following claims.

I claim:

1. Apparatus for forming a structural unit from a bundle of parallel glass fibers impregnated with an uncured thermosetting resin, comprising
   a rigid stationary mandrel;
   a flexible mounting sheet removably connected and in contiguous surface engagement with said mandrel;
   and a flexible elastic, non-metallic, longitudinally-split sleeve secured to said mounting sheet on the opposite side thereof from said mandrel and having a non-planar configuration when said sheet is connected with said mandrel, said sleeve being adapted to receive said resin-impregnated fibers for molding the same, whereby upon curing of the resin and removal of the mandrel from the flexible mounting sheet, the sleeve may be stripped from the resultant hardened product.

2. Apparatus for forming a structural unit from a bundle of parallel glass fibers impregnated with an uncured thermosetting resin, comprising
   a rigid stationary mandrel;
   a flexible mounting sheet removably mounted on said mandrel;
   and a plurality of intersecting angularly arranged flexible longitudinally-split sleeves secured to said mounting sheet on the opposite side thereof from said mandrel, the bores of said sleeves being in communication with each other, said sleeves being adapted to receive said resin-impregnated fibers to mold the same, whereby upon curing of the resin and removal of the mandrel from the mounting sheet, the sleeves may be stripped from the resultant hardened product.

3. Apparatus for forming a structural unit from a bundle of parallel glass fibers impregnated with an uncured thermosetting resin, comprising
   a rigid stationary mandrel consisting of a plurality of separable mandrel elements; a flexible mounting sheet removably connected and in contiguous surface engagement with said mandrel;
   and a flexible elastic non-metallic longitudinally-split sleeve secured to said mounting sheet on the opposite side thereof from said mandrel and having a non-planar configuration when said sheet is connected with said mandrel, said sleeve being adapted to receive said resin-impregnated fibers to mold the same, whereby upon curing of the resin and removal of the mandrel from the mounting sheet, the sleeve may be stripped from the resultant hardened product.

4. Apparatus for forming a structural unit from a bundle of parallel glass fibers impregnated with an uncured thermosetting resin, comprising
   a rigid stationary mandrel consisting of a plurality of separable mandrel elements, said mandrel having a curved surface defined by said separable elements;
   a flexible mounting sheet removably mounted on said mandrel curved surface;
   and a flexible elastic non-metallic longitudinally-split sleeve secured to said mounting sheet on the opposite side thereof from said mandrel and having a non-planar configuration when said sheet is connected with said mandrel, said sleeve being deformed into a non-linear configuration owing to the mounting of said mounting sheet on said mandrel curved surface and being adapted to receive said resin-impregnated fibers to mold the same, whereby upon curing of the resin and removal of the mandrel from the mounting sheet, the sleeves may be stripped from the resultant hardened product.

References Cited in the file of this patent

UNITED STATES PATENTS

| | | |
|---|---|---|
| 2,484,003 | Simison | Oct. 4, 1949 |
| 2,602,766 | Francis | July 8, 1952 |
| 2,816,323 | Munger | Dec. 17, 1957 |
| 2,835,924 | Schmeling | May 27, 1958 |
| 2,858,875 | Lyman | Nov. 4, 1958 |
| 2,871,911 | Goldsworthy et al. | Feb. 3, 1959 |

FOREIGN PATENTS

| | | |
|---|---|---|
| 426,203 | Great Britain | Mar. 25, 1935 |
| 555,517 | Italy | Jan. 26, 1957 |